Oct. 13, 1970

F. M. O. FÖRSTER 3,534,258

MAGNETIC NONDESTRUCTIVE TESTING SYSTEM UTILIZING MAGNETIC TAPES WITH MEANS TO INDICATE FLOW DEPTH

Filed May 26, 1967

7 Sheets-Sheet 1

INVENTOR
Friedrich M.O. Förster

By [signature]
ATTORNEY

Oct. 13, 1970 F. M. O. FÖRSTER 3,534,258

MAGNETIC NONDESTRUCTIVE TESTING SYSTEM UTILIZING MAGNETIC TAPES WITH MEANS TO INDICATE FLOW DEPTH

Filed May 26, 1967

7 Sheets-Sheet 2

INVENTOR
Friedrich M.O. Förster

By [signature]
ATTORNEY

Oct. 13, 1970 F. M. O. FÖRSTER 3,534,258

MAGNETIC NONDESTRUCTIVE TESTING SYSTEM UTILIZING MAGNETIC TAPES WITH MEANS TO INDICATE FLOW DEPTH

Filed May 26, 1967 7 Sheets-Sheet 3

INVENTOR
Friedrich M.O. Förster

By [signature]
ATTORNEY

INVENTOR
Friedrich M.O. Förster
By [signature]
ATTORNEY

Oct. 13, 1970 F. M. O. FÖRSTER 3,534,258
MAGNETIC NONDESTRUCTIVE TESTING SYSTEM UTILIZING MAGNETIC TAPES WITH MEANS TO INDICATE FLOW DEPTH
Filed May 26, 1967
7 Sheets-Sheet 5
Fig. 9
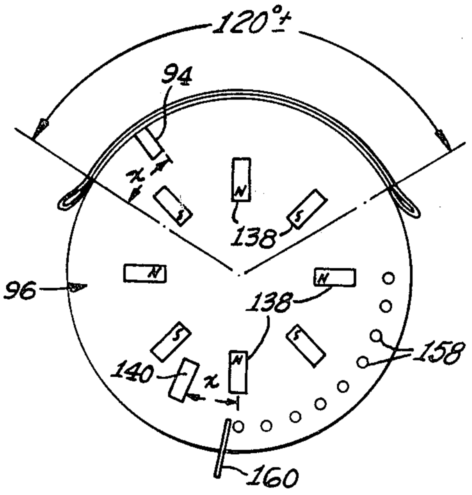
Fig. 10
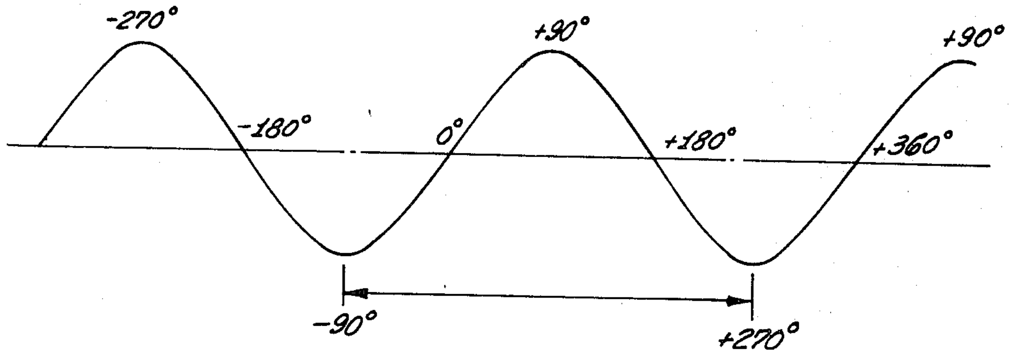
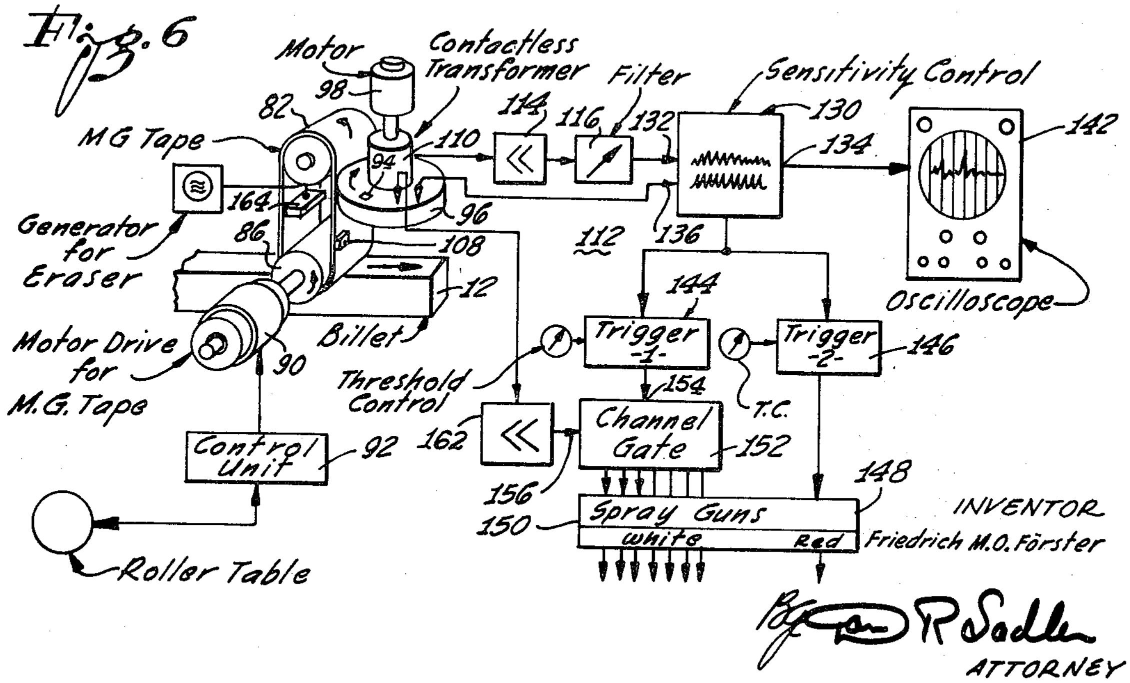
INVENTOR
Friedrich M.O. Förster
By [signature]
ATTORNEY Oct. 13, 1970 F. M. O. FÖRSTER 3,534,258

MAGNETIC NONDESTRUCTIVE TESTING SYSTEM UTILIZING MAGNETIC TAPES WITH MEANS TO INDICATE FLOW DEPTH

Filed May 26, 1967 7 Sheets-Sheet 6

INVENTOR
Friedrich M.O. Förster

By [signature]
ATTORNEY

Oct. 13, 1970 F. M. O. FÖRSTER 3,534,258

MAGNETIC NONDESTRUCTIVE TESTING SYSTEM UTILIZING MAGNETIC TAPES WITH MEANS TO INDICATE FLOW DEPTH

Filed May 26, 1967 7 Sheets-Sheet 7

INVENTOR
Friedrich M.O. Förster

By [signature]
ATTORNEY 3,534,258

MAGNETIC NONDESTRUCTIVE TESTING SYSTEM UTILIZING MAGNETIC TAPES WITH MEANS TO INDICATE FLOW DEPTH

Friedrich M. O. Förster, 144 Der Schaene Weg, 741 Reutlingen, Germany

Filed May 26, 1967, Ser. No. 641,659
Int. Cl. G01r 33/12
U.S. Cl. 324—37 13 Claims

ABSTRACT OF THE DISCLOSURE

A magnetic nondestructive testing system is disclosed wherein a workpiece, such as a billet, is magnetized to produce stray magnetic fields. These stray magnetic fields are recorded on an endless magnetic tape and the tape is scanned by a suitable magnetic pickup to produce electrical signals. Means are provided for processing the signals to indicate discontinuities. The means are effective to compensate for various factors, such as fall-off of the magnetic field, variations in the shape of the discontinuity, the lateral position of the discontinuity, etc.

In magnetic types of nondestructive testing a magnetic field is produced in the workpiece by some suitable means such as circulating a current through the workpiece or passing the workpiece through a magnetic yoke. If the workpiece has any magnetic discontinuities, such as a crack, void, inclusion, etc. the magnetic field is distorted in the region of the discontinuity. If the discontinuity extends to the surface of the workpiece or is close to the surface, a so-called stray field is produced outside of the workpiece immediately adjacent the surface portion containing the discontinuity. By identifying any such stray fields it is possible to identify the discontinuities and determine whether or not they are defects.

One way of identifying the stray fields is to spread finely divided magnetic particles across the surface of the workpiece. These particles may be in the form of a fine dry powder or a liquid suspension. If there are no discontinuities and, therefore, no stray fields, the particles are distributed in a more or less random pattern. However, any stray field attracts at least a portion of the magnetic particles. The particles are, therefore, arranged into pattern corresponding to the discontinuity. A skilled operator, by observing these particle patterns, can locate most magnetic discontinuities and can with a fair degree of accuracy, determine some of the characteristics of the discontinuity and whether or not it is a defect. Although this form of manual-magnetic particle testing has been used extensively for inspecting a wide variety of different types of workpieces, it has a large number of objections. These objections are particularly acute when the workpiece has a rough or irregular surface. First of all the reliability of the inspection results are entirely dependent upon the operator visually observing all of the magnetic particle patterns and not missing any. Assuming the operator observes a pattern it is then necessary for him to decide whether the pattern is really produced by a magnetic discontinuity or merely a sticky or rough surface etc. Secondly, it is virtually impossible for an operator to accurately determine the dimensions of the discontinuity and particularly the depth of a crack and/or its width. It has, therefore, been extremely difficult, if not impossible, to distinguish between discontinuities that are of minor or acceptable nature, those that are of an objectionable nature but capable of being corrected or repaired and those that are of objectionable nature and beyond correction or repair. Accordingly, this form of testing has not been entirely satisfactory for testing large numbers of workpieces, such as billets, at a high rate of speed.

Another way of identifying the stray fields is to utilize a pickup probe capable of sensing a magnetic field. Such a probe is scanned across the workpiece and passed through the stray magnetic fields. If the probe detects or senses variations in the stray fields it is possible to locate the discontinuities. Moreover, if the probe is capable of measuring the strength of the field, it is possible to determine the size, characteristic etc. of the discontinuity. Magnetic systems utilizing stray field probes are suitable for use on some types of workpieces, particularly those having very rough and irregular surfaces. For example, workpieces such as steel billets produced in steel mills have surfaces that are very rough and irregular. When inspecting this type of workpiece it is extremely difficult, if not impossible, to properly guide a magnetic pickup probe across the irregular surfaces. The probe must not be damaged by colliding with any irregularities. However, at the same time the probe must be very close to the surface in order to produce a strong signal and to resolve the small fields around small discontinuities, such as fine cracks etc. As a consequence systems utilizing a pickup probe have not been capable of inspecting rough and irregular workpieces, such as steel billets etc. particularly where it is necessary to make the inspections at very high rates of speed and to resolve very small defects.

In order to overcome the foregoing difficulties it has been proposed to place a magnetic medium, such as a flexible magnetic tape, on the surface of the workpiece while it is magnetized. If any stray magnetic fields are produced they are recorded upon the flexible medium or tape. The tape is then scanned to sense and/or measure the recorded stray fields. Systems of this nature are disclosed in U.S. Pat. No. 2,648,435, Kodis entitled "Method and Apparatus for Magnetic Testing"; No. 2,764,733, De Forest entitled "Method and Means for Detecting Flaws"; and, No. 3,262,053, Nasir entitled "Method of and Apparatus for Magnetically Detecting Flaws in Ferromagnetic Objects by Superimposed Magnetic Tapes or Rollers Thereon." Heretofore, systems of this general type have not been entirely satisfactory for reliably inspecting workpieces and particularly on a commercial basis where a large number of members having irregular surfaces and shapes, such as steel billets, must be inspected at high rates of speed. Among other things, such prior systems have not been capable of withstanding the wear and tear inherent in processing heavy, rough irregular surfaces, such as are present on steel billets. Also, the prior systems have not been capable of reliable testing all portions of the billet. For example, such systems have not been capable of inspecting such portions of a workpiece as the edges and corners and up to and around the ends. Moreover the prior systems have not been capable of reliably determining various characteristics of a discontinuity, such as its size, shape, etc. particularly on a fully automatic basis. Accordingly, heretofore, the use of such systems has been confined to inspecting small parts of simple shapes and they have been forced to operate at a sufficiently slow speed to permit an operator to observe the results. Moreover, the accuracy of the system has been dependent upon the operator manually interpreting the results and determining the characteristics of a discontinuity, i.e. is it of an acceptable nature, is it irrepairable and if it is repairable, where and to what extent should the repairs be made. As a result even systems employing a magnetic tape recording medium have not been entirely satisfactory, particularly for high speed commercial testing.

The present invention provides means for overcoming the foregoing difficulties. More particularly the present invention provides an inspection system which may be made fully automatic and free from any operator interpretation. Also, the system may be especially adapted for high speed testing of rough and irregular objects (such as billets produced in a steel mill) on a commercial basis. The system identified only defects in the workpiece which are of an objectionable nature and determines the extent of repairs to be made or whether defects are irrepairable.

In the single embodiment of the invention disclosed herein the foregoing is accomplished by providing a magnetic nondestructive testing system wherein a flexible magnetic endless belt is rolled along the surface of a workpiece, such as a billet to record any stray flux fields. This belt is then scanned by a suitable magnetic pickup to create a series of signals corresponding to the stray fields that have been recorded upon the belt. Means are provided to compensate for various factors, such as the characteristics of the workpiece, the location of the defect etc. As a consequence the defect signals which have heretofore been of an extremely complex nature and only partially related to the particular characteristics of the discontinuity of interest are now simplified. As a result the present embodiment provides signals which have an easily measureable characteristic closely related to the characteristics of the discontinuities. In addition, means are provided that are responsive to the characteristics of the signal whereby a rejection or corrective actions can be made fully automatically without relying on any operator interpretation.

These and other features and advantages of the present invention will become readily apparent from the following detailed description of a single embodiment thereof, particularly when taken in connection with the accompanying drawings wherein like reference numerals refer to like parts and wherein:

FIG. 6 is a combination perspective view and block diagram of the test system portion of FIG. 1;

FIG. 9 is a fragmentary plan view of a rotating turntable pickup portion of one of the inspection units;

FIG. 10 is a graph presenting one set of operating characteristics of the system.

Figures 1, 2:
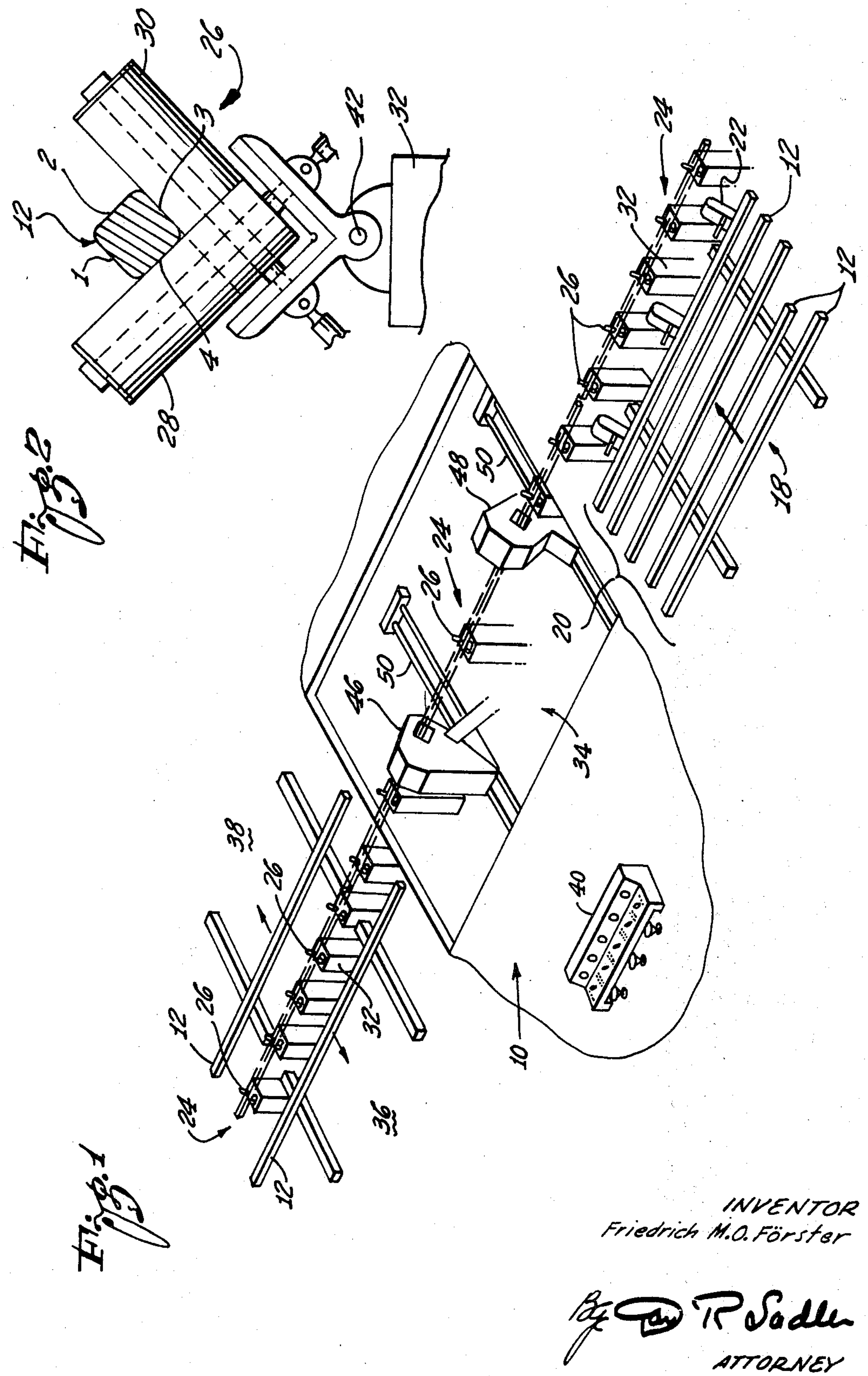
FIG. 1 is a perspective view of a billet handling and testing system embodying one form of the present invention.
FIG. 2 is a fragmentary view, on a greatly enlarged scale, of a portion of the billet handling system.

Referring to the drawings in more detail and particularly to FIGS. 1 to 5 the present invention is embodied in a system 10 for inspecting workpieces at the high rates of speed normally present in a modern production process. These workpieces may be of any desired nature, size, shape, etc. where magnetic testing can be employed. However the present invention is particularly useful for inspecting relatively large elongated objects, such as long bars, rails, rods, pipes, etc. By way of example, the present embodiment is especially adapted for inspecting steel billets 12 such as are commonly produced in present day steel mills.

The steel billets 12 are normally formed by rolling a large bloom or ingot into a square or nearly square cross section. The sides 1, 2, 3 and 4 of a small billet 12 may be on the order of 1 or 2 inches or less while a large billet may be on the order of twelve inches or larger. The length of a billet 12 varies over a considerable range but is frequently up to forty feet or longer.

Hopefully a billet is straight over its entire length and has a true rectangular or square cross section. However, as a practical matter the billets are usually bent and not of a square or rectangular shape. Moreover a considerable number of billets have a substantial amount of bend or bow in one or more directions and a large amount of twist. A fully rolled billet has a so-called "black surface" which is rough and irregular. The surface is covered with scale and a considerable amount of dust and dirt. Some of the scale is in the form of relatively large flakes which are loose and separate easily from the billet. The rest of the scale is "tight," i.e. it adheres very tightly to the surface and is not readily removed. It will thus be seen that a "typical" billet may have a somewhat irregular or unpredictable shape as well as a fairly rough and irregular surface.

A "perfect" billet is a solid ferrous member free from any magnetic discontinuities. However, on some occasions a billet may include one or more magnetic discontinuities. Some of these discontinuities may not be of a serious or rejectable nature whereas some may be of a very serious nature and constitute defects that must be corrected or the billet rejected. Common types of defects include small cracks or so-called "seams" 14 in or near the surface. If a billet having a defect, such as a seam, is further processed such as by rolling into a round bar, plate, sheet, structural shape, etc., the depth of the defect is normally decreased somewhat while its size and particularly its length is increased. The defect can cause severe stress concentrations which will result in a failure during the further processing of the billet or the finished product during loading thereof. Such a failure can result in a major economic loss or at least the billet and all of the time and work invested therein. On occasions even damage to the processing machinery occurs.

It has been found the defects in a workpiece may be divided into three categories. Those in the first category are so small they may be ignored without causing any significant loss. If the defect is a seam in a billet it is usually of an acceptable nature if it is on the order of less than about 0.008″ to 0.012″ deep. However, these limits may vary over a considerably greater range depending upon the future use of the billet and may be greater or smaller than those mentioned.

Those defects in the second category are deeper than the foregoing limit and will cause difficulties if ignored. However, the defects in this category are sufficiently shallow to be removed by torch burning or grinding out the area containing them.

Defects in the third category are so deep it is not practical to remove them. As a result a billet containing a defect of this nature is normally cut up and classified into shorter lengths or remelted. If the irrepairable defect is a seam it is normally in excess of about 0.025″ to about 0.040″ deep. This depth, of course, depends upon the type of dressing equipment used to remove the seam, the future uses of the billet, etc. and may be more shallow or deeper than those mentioned.

It can be appreciated in order to make a meaningful classification of the defect into the foregoing categories and efficiently dressing the billets 12 to remove only the necessary defects, it is essential to make an accurate determination as to the depth of the defect.

The inspection systems available heretofore have not been capable of determining the depth of a defect to this degree of accuracy. Moreover, to a large extent, they have been dependent upon an operators judgment. As a consequence it has been customary to dress out practically all seams that were located whereby an excessive amount of time consuming and expensive removal has occurred. Also very frequently excessively deep defects were partially dressed out whereby subsequent failures occurred.

As indicated above, steel billets are normally relatively large and heavy and the present invention is particularly adapted to inspect the billets at high rates of speed. Accordingly, it has been found desirable to eliminate any manual handling of the billets and provide a material handling system 16 capable of substantially automatically transporting the billets and classifying them.

One type of system suitable for this purpose is illustrated in the perspective view in FIG. 1. The fully rolled but uninspected billets are accumulated in a storage area 20. The billets are disposed in a generally parallel array 18 and supported so as to be transported laterally across the area. A loader 22 is disposed adjacent the side of the storage area 20 for separately moving the billet nearest the edge of the area. This loader 22 may include several conveyor belts or chains having arms which extend under the billet and lift it up to a conveyor line 24. The billet is then rolled sideways onto the conveyor line 24 for being transported longitudinally therealong.

The conveyor line 24 includes successive sets 26 of rollers. Each set 26 includes a pair of rollers 28 and 30 disposed at right angles to each other. The sets 26 are mounted on top of a series of pedestals 32 disposed in a straight line. Both of the rollers 28 and 30 in each set 26 are preferably disposed at 45° to the horizontal whereby the billets 12 will rest against both of the rollers in the set. This will carry the billet 12 along one side. One of the diagonals of the billet 12 is vertical and the other horizontal whereby the billet 12 appears as a diamond.

The conveyor line 24 extends from the storage area 20 through an inspection area 34 to unloading or classifying areas 36–38. One or more of the rollers in one or more of the pairs may be power driven so as to transport the billet 12 along the conveyor line 24 at a relatively high rate of speed. A console 40 may be provided whereby the operator may control the loading of the billets 12 onto the conveyor line 24 and may cause the billet 12 to travel in either direction along the line 24. It has been found billets very frequently are not straight but have a considerable amount of twist. It has also been found under some circumstances the billet may not be square, i.e. the corners are oblique angles and/or the sides are not parallel. In order to accommodate these irregularly shaped billets it has been found desirable for the sets 26 and the individual rollers 28 and 30 therein to be compliant, i.e. the rollers should be free to move and follow the billet rather than try to maintain the billet straight.

The sets 26 of rollers in the classifying area 36–38 may be mounted on a pivot 42 similar to FIG. 2. Actuators, such as a hydraulic cylinder, causes the sets 26 to swing in one direction and dump the billets 12 of one type (for example, rejects) in a first direction into the area 36 or swings in the opposite direction and dumps the billets 12 of another type (for example, acceptable) in the second direction into the area 38. If the billets 12 are to be classified or sorted into more than two categories the conveyor line 24 may be extended on past the areas 36–38 to additional areas.

Each side 1, 2, 3 and 4 of the billet may be individually inspected by means of a separate operation. However this requires four separate inspection operations and at least four trips along the conveyor 24. Accordingly it has been found desirable to simultaneously inspect all four sides of the billet 12 during a single pass along the conveyor line. In the present embodiment this is accomplished by providing a pair of separate inspection stations or units 46 and 48 in the inspection area 34. Each of the units 46 and 48 is capable of inspecting the opposite sides of a billet. For example, one unit may inspect sides 1 and 3 while the other inspects sides 2 and 4. As a consequence all four sides of the billet 12 are inspected during a single pass of the billet along the conveyor line 24 without rotating the billet etc.

Figure 3:
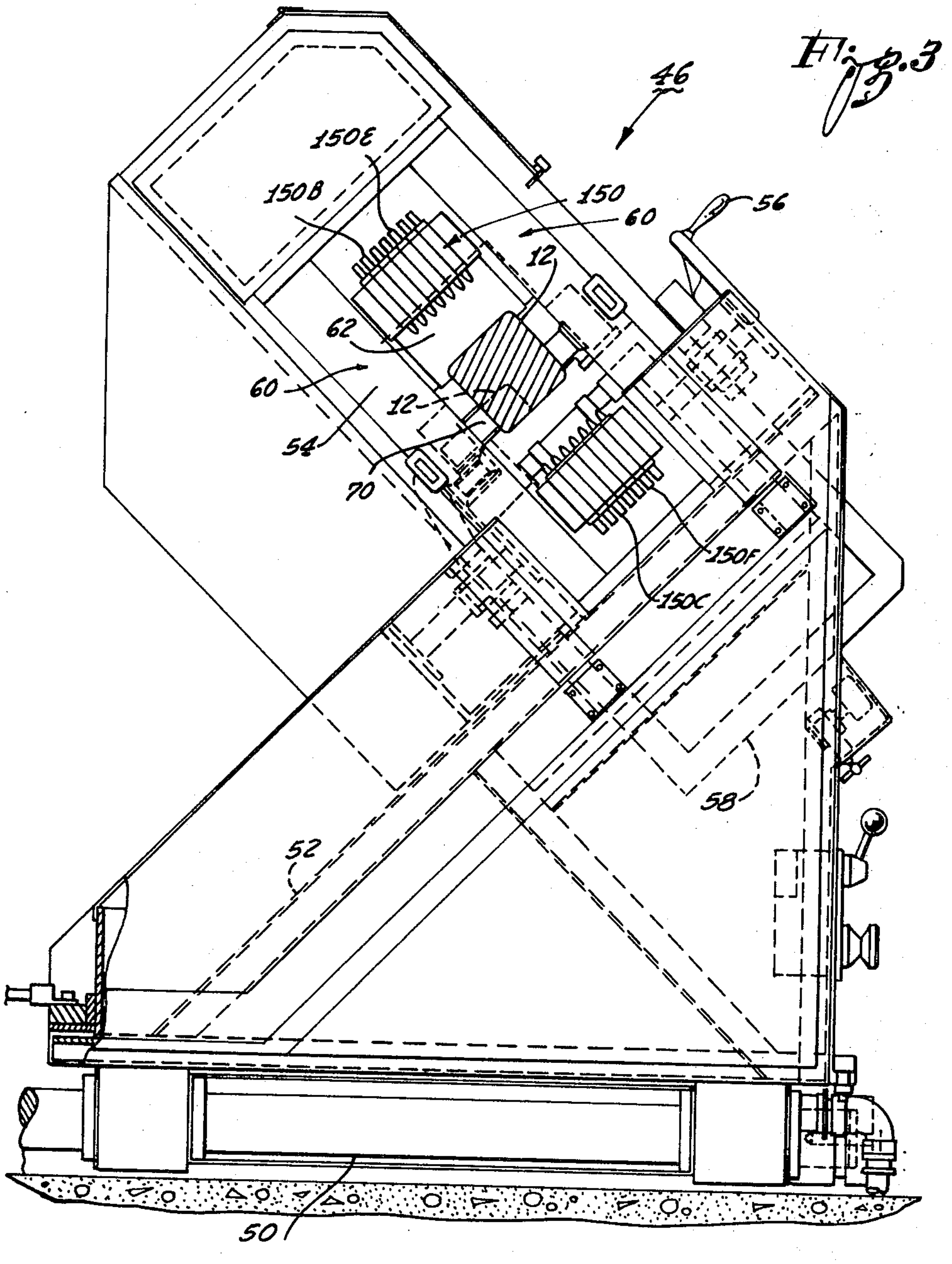
FIG. 3 is a side view of one of the inspection units embodied in the system of FIG. 1.
Figure 4:
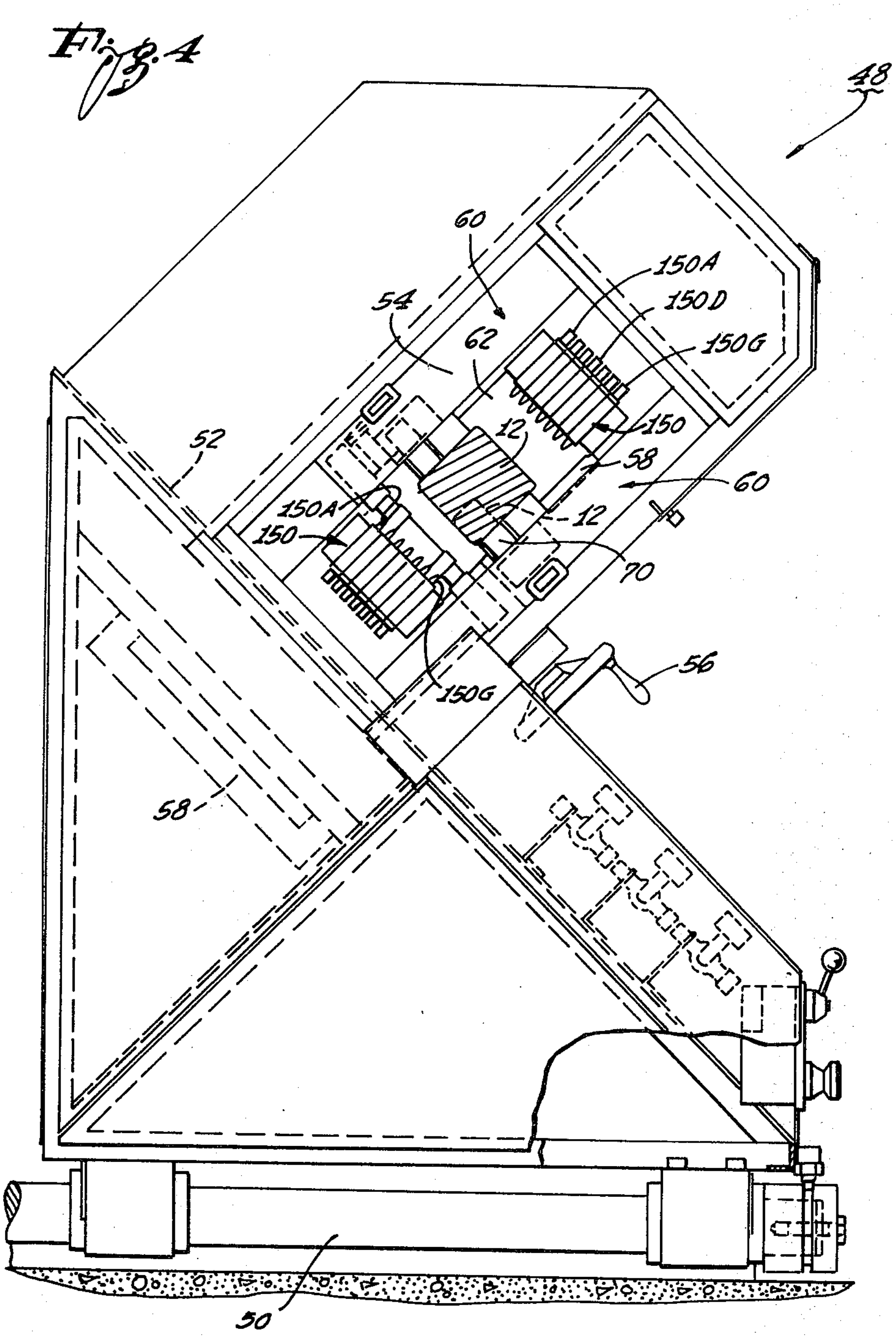
FIG. 4 is a side view of another of the inspection units embodied in the system of FIG. 1.
Figure 5:
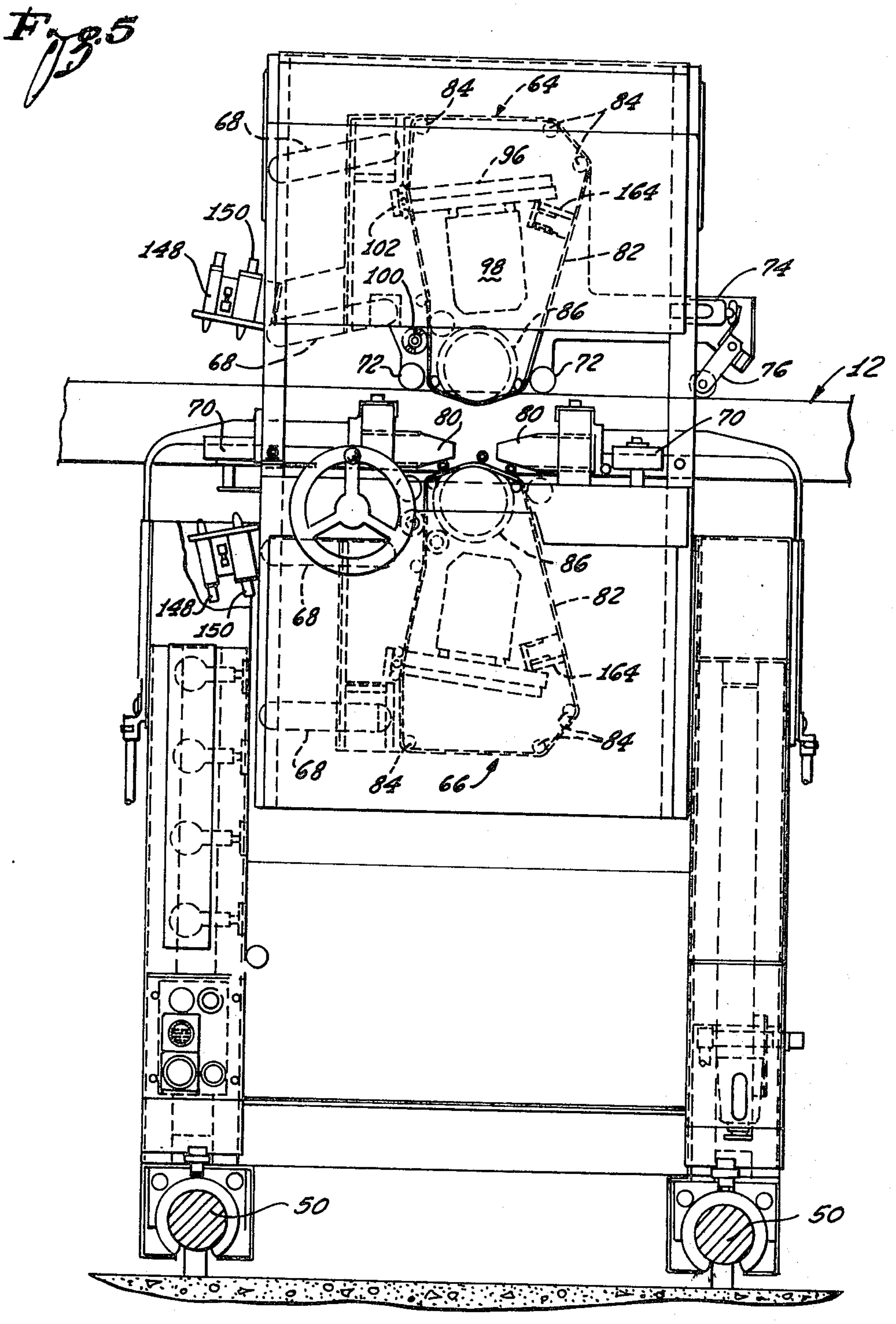
FIG. 5 is a front view of one of the inspection units embodied in the system of FIG. 1.

As best seen in FIGS. 3, 4 and 5 the units 46 and 48 are very similar to each other. However, since they inspect pairs of surfaces at right angles to each other they are generally symmetrical and may be considered as right hand and left hand units. Each unit is mounted on a way 50 extending across the conveyor line 24. This permits either one or both of the units 46 and 48 to be retracted out of the line whereby one of the units may be serviced etc. while the billets are traveling along the line.

In the event one of the units is inoperative all four sides of the billet may still be inspected. After the billet has passed through the operative unit and one pair of sides inspected, the billet may be rotated 90° and again passed through the unit a second time. During the second pass the other pair of sides are inspected.

Each unit 46 and 48 includes a diagonal guide 52 parallel to the sides 1 and 3 or 2 and 4 of the billet 12 tested by that unit. A carriage 54 is mounted upon the guide 52 and moved therealong by means of a hand wheel 56. The carriage 54 includes a frame 58 having a pair of sides 60 disposed at right angles to the guides 52 and spaced to form an opening 62 through which the billet 12 passes. A pair of test heads 64 and 66 are mounted on the frame 58 by means of linkages 68 which allow the test heads 64 and 66 to move parallel to the sides 60, i.e. toward and away from the billet 12 passing through the carriage 54. The hand wheel 56 is effective to adjust the position of the carriage 54 and the test heads 64 and 66 to accommodate the different size billets. During a normal inspection run all of the billets are the same size. Accordingly, before the beginning of a production run the hand wheel 56 is adjusted to position the carriage 54 and test heads 64 and 66 to accept a particular size billet. During the rest of the run no further adjustments are made to the hand wheel 56.

It may be appreciated this form of support allows the test heads 64 and 66 to move in various directions to accommodate the irregularities in the shape of the billet 12 and thereby follow the sides being inspected. Side rollers 70 may be provided on the frame 58 for engaging the sides of the billets 12 and maintaining the frame 58 and the test heads 64 and 66 thereon aligned with the billets 12. Guide rollers 72 may also be provided on the test heads 64 and 66 for maintaining them properly spaced above the billet 12.

Furthermore either one or both of the test heads 64 and 66 may be moved into a retracted position spaced from the billet 12 or moved into an extended or test position for engaging the billet during an inspection operation. In the present instance a control switch 74 having a feeler arm 76 is provided to just clear the maximum irregularly shaped billet that can be inspected. If the billet is bent beyond acceptable limits, is too big for the setting of the hand wheel 56, has a bent end etc. the arm 76 will be deflected so as to actuate switch 74. This will stop the conveyor and/or retract the carriages 54.

In addition a sequence of pickup units such as photo cells may be provided for sensing the passage of the billet. A first photo cell is provided to sense the ends of the billet at about the time they pass the right hand brush 80 (as seen in FIG. 5). A second photo cell is provided to sense the ends of the billet as they move past the rollers 86. A third photo cell is provided to sense the ends of the billet at about the time they pass the left brush 80.

When the leading end of an entering billet (traveling right-to-left as seen in FIG. 5) passes the first photo cell a pneumatic control lifts the carriage 54 whereby roller 70 engages the billet and maintains the carriage 54 in position. When the leading end passes the second photo cell the test heads 64 and 66 are extended into the test position whereby the tapes 82 are pressed against the billet by the resilient rollers 86. When the leading end passes the third photo cell the brushes 80 are extended into engagement with the sides of the billets and the test current is turned ON. When the trailing end of the billet passes the first photo cell the test current is turned OFF, the brushes 80 retracted and the test heads retracted. Normally the carriage 54 stays in position until the end of the test portion of the billet has passed the spray guns or markers. When a billet 12 is not in position for testing, the heads 64 and 66 are retracted and out of the path of any irregularly bent or hooked ends of a billet. Also if a hooked end of a billet approaches the tape etc. it will strike the arm 76 and actuate switch 74. This will stop the billet and/or retract the test heads.

Each unit 46 and 48 includes means for magnetizing the billet 12 whereby stray fields are created around any magnetic discontinuities in the billet 12 at the time they move past the test heads 64 and 66. A magnetic yoke or the equivalent thereof may be used for producing such a field. However, in the present instance electrical contacts 80 are provided for contacting the sides of the billet and circulating a current through the billet.

Since this system 10 is primarily intended to locate defects such as a seam or crack that have longitudinally extending components the current is circulated axially of the billet 12. This creates a magnetic field extending circumferentially around the billet 12 and across longitudinally extending cracks etc. The contacts 80 may be in the form of rollers, brushes, etc. capable of withstanding engagement with the rough, irregular surface of a billet 12. When the end of a billet 12 is disposed between the contacts 80 the flow of the test current is disrupted. Accordingly, it is desirable for the contacts 80 to be as close together as possible whereby the billet 12 may be tested as close as possible to the end. The photo cells are arranged to extend and retract the contacts 80 as close as possible to the ends.

All of the test heads 64 and 66 are substantially identical and may best be seen in FIG. 5. FIG. 6 is a schematic showing of some of the structural parts of the test heads and a block diagram of the electronics that are associated therewith. Each test head 64 and 66 includes a magnetic belt 82 for magnetically recording any stray flux fields present around a billet 12 passing the head. This belt 82 is preferably an endless loop on the order of a few feet long. The belt 82 may be a more or less conventional magnetic recording tape. However it is normally "ruggedized" to withstand the severe environment and abrasion inherent in rolling across a billet. The belt 82 is supported on one or more idler rollers or guides 84. In addition a pressure or contact roller 86 engages the belt 82. These rollers are effective to maintain the belt reasonably tight around the entire loop.

The pressure or contact roller 86 is adapted to engage the billet 12 and force the outside of the belt 82 against the surface of the billet 12 being inspected. Preferably the tread or rim 88 of the roller 86 is very resilient (for example it may be a sponge rubber etc.) whereby the billet 12 tends to sink into the roller 86. The guide rollers 72 are positioned to maintain the heads 64 and 66 positioned with the rim 88 of the roller 86 compressed approximately as shown in the drawings.

The roller 86 will thereby be effective to bias the belt 82 into intimate contact with all portions of the surface on one side of the billet 12. More partciularly the belt 82 is forced into convolutions, hollow spots etc. normally present on the surface of a billet. Since the spacing between the magnetic particles in the belt 82 and the surface of the billet 12 is very small and constant, a maximum strength recording of any stray field is provided and there is a constant relation between the strengths of the stray fields and the recordings.

As has been mentioned before, the billet may have a considerable amount of twist. A large part of this twist can be absorbed by the resilient roller 86. However it has been found in some installations many of the billets are very heavily twisted and the capabilities of the roller and tape are frequently taxed to their limits. Under these circumstances the carriage, test heads and/or rollers etc. may be pivotally mounted. Guide means may then maintain the axis of the roller 86 substantially parallel to the surface of the billet.

Figures 7, 8:
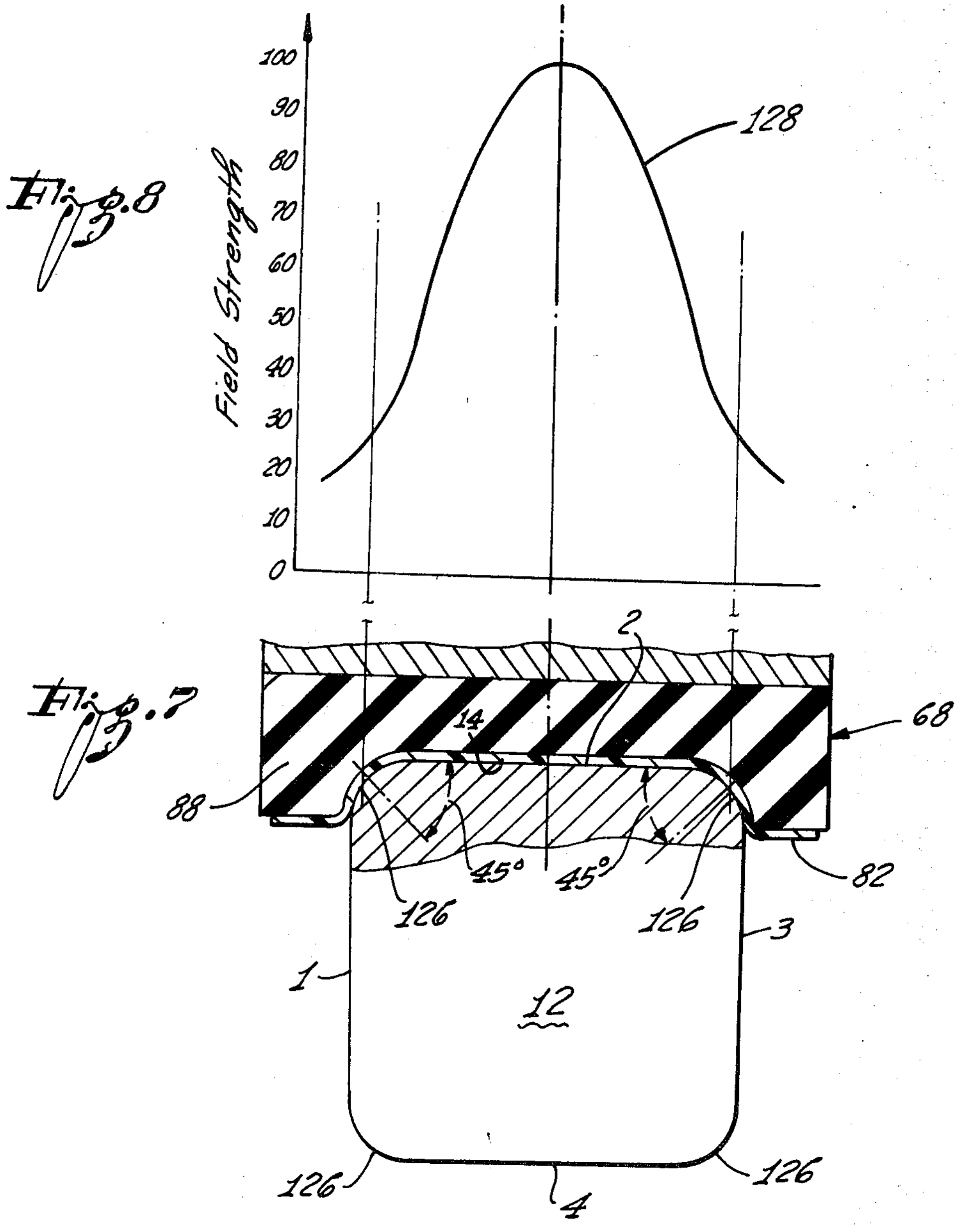
FIG. 7 is a fragmentary end view of portions of a billet and inspection station as the billet passes therethrough.
FIG. 8 is a graph of one set of operating characteristics of the system.

The length of the roller 86 and the width of the belt 82 are preferably considerbly greater than the width of the largest billet 12 to be inspected. As best seen in FIG. 7 (but also visible in FIGS. 3 and 4) this insures the belt 82 being wrapped at least partially around the edges or corners 126 of the billet 12 and along the adjacent sides thereof. Each belt 82 thereby not only makes a linear recording of any stray fields present in all portions of the side being inspected, but also any stray fields present in and around the corners 126. As a consequence between the four belts the entire surface of the billet, including the entire corner area, is fully inspected.

As the billet 12 moves past the heads 64 and 66 it will cause the belt 82 to travel around the rollers 84 and 86. However it has been found advantageous to couple a drive motor 90 to one of the rollers. The motor 90 is regulated by a control unit 92 responsive to the travel of the billet 12 along the conveyor line 24. This greatly reduces friction and wear between the belt 82 and billet 12 and also prevents a loss of synchronization from slipping.

It can be appreciated that in the portion of the system 12 described so far, as the billet 12 travels through the inspection units 46 and 48, the contacts 80 circulate a current axially through the portion of the billet 12 contacted by the belt 82, the axially flowing current produces a circumferential magnetic field in the billet 12 and stray fields are produced above the billet 12 adjacent any longitudinal discontinuities, such as a seam 14. As the belt 82 is rolled along the billet 12 all of these stray fields are recorded on the belt 82. Accordingly a magnetic recording or "print" of the stray fields is preserved on the belt 82. In order to identify the sources of stray fields means are provided for magnetically reading the recordings on the belt 82 as it travels around the loop.

Although the recordings may be read by any suitable means in the present instance one or more magnetic pickups 94 are mounted on a turntable 96 for scanning across the belt 82 and sensing the fields recorded thereon. The turntable 96 may be disposed in any desired position for scanning pickups 94 across the belt 82. For example it may be disposed in a plane generally parallel to the belt 82. The pickups 94 will thereby scan across the belt in a series of generally parallel arcuate paths. However for purposes of illustration the turntable is disposed in a plane substantially at right angles to the belt 82 and is driven by a motor 98. As a consequence each pickup 94 follows a substantially straight line transversely across the belt 82.

The turntable 96 may be mounted outside of the belt 82 substantially as shown in FIG. 6, whereby the pickup 94 scans the same surface that contacted the billet 12. This permits the magnetic material in the belt 82 to be very close to both the billet 12 and the pickup 94. However, it has been found most billets have a substantial amount of loose scale and/or dirt which is picked up and carried by the belt 82. Most of this material may be removed by one or more brushes 100 riding on the belt 82. However, it has been found advantageous to place the turntable 96 and drive motor 98 inside of the belt 82 as best seen in FIGS. 5 and 9. The pickup 94 now scans the backside of the belt 82 whereby the turntable 96 is exposed to very little, if any, dirt.

In this embodiment belt 82 is formed into a generally semi-cylindrical shape conforming to the path swept by the pickup 94 by means of a belt guide 102. This guide 102 may include a member having a smooth surface or it may include a plurality of balls or rollers. The guide 102, turntable 96, belt 82, etc. are arranged whereby the belt 82 extends around about 120° of the turntable 96. Throughout this arc a substantially uniform space is maintained between the pickup 94 and the surface of the belt 82. Since the surface of the belt 82 is very smooth the clearance space between the pickup probe 94 and the belt 82 may be very small whereby a signal is produced which is very strong and a linear function of the strength of the recordings.

The probe or pickup 94 may be of any desired variety. For example, a conventional magnetic pickup head of the type used in magnetic tape reproduction systems may be employed. However, it has been found preferable to use a very sensitive microprobe of the type disclosed and claimed in co-pending application for patent Ser. No. 661,458 filed August 17, 1967, in the name of Dr. Friedrich Forster, entitled Magnetic Nondestructive Testing System.

Normally the billet 12 is free of discontinuities and very little, if any, stray field is recorded upon the belt 82. With a pickup 84 of the foregoing variety the signal generated by the probe 94 will normally be substantially zero. However, when a defect 14 having a longitudinal component has caused a stray field to be recorded upon the belt 82 a short duration pulse is produced each time the pickup 94 passes over the recorded field.

As previously pointed out, the test current can only circulate through the billet 12 when both sets of contacts 80 are in direct engagement with the billet 12. Thus, when one end of the billet 12 is disposed between the contacts 80 there is no test current within the billet 12 and a test can no longer be made. Therefore, in order to permit testing of the billets 12 up to the ends it is highly desirable for the brushes 80 to be disposed as closely as possible to the area contacted by the magnetic belt 82.

The heavy currents in and around the brushes 80 and the area of contact produce spurious magnetic fields of considerable magnitude. Since the resilient roller 86 forces the edges of the belt 82 downwardly between the contacts 80 a significant field may be recorded along these edge portions. If the pickup 94 senses such recordings it will produce signals corresponding to a very objectionable defect 14.

To overcome this difficulty a shield 106 may be disposed between the turntable 96 and the edge portions of the belt 82. This shield 106 will remove the edge portions of the belt 82 beyond the sensitive range of the probe 94 and prevents the stray recordings producing a field in the path swept by the probe 94. Alternatively, or in addition, it has also been found desirable to provide marginal erase heads 108 to erase the edge portions of belt 82 and/or to gate the pickup 94 OFF during this scan interval.

The signal produced by the pickup 94 may be coupled from the rotating turntable 96 by slip rings, brushes etc. However, this frequently introduces "noise" into the signal closely resembling the signals from the pickup. To avoid this it has been found preferable to utilize a contactless or rotary type of transformer 110.

One portion of the core and the primary are mounted on the turntable 96 and rotated therewith. The primary winding is coupled directly to the pickup 94. A second portion of the core and the secondary are mounted in a stationary position adjacent to the rotating portion whereby the two windings are inductively coupled together. It will thus be seen the signals from the probe 94 are coupled through the transformer 110 without any sliding mechanical contacts.

The secondary of the transformer 110 may be coupled to any system 112 that is responsive to the signals and effective to indicate the characteristics of the billet 12.

In the present instance this includes an amplifier 114 effective to increase the magnitude of the signals produced by the pickup 94 to a more useful level and improve the signal-to-noise ratio. Normally this amplifier 114 has a fairly high gain and a sufficiently broad frequency response to prevent any material distortions of the pulse type signals.

A filter 116 may be coupled to the amplifier 114 to suppress background noises etc. which are outside the frequency spectrum of interest. Normally this is accomplished by means of the band pass filter 116 which suppresses the very low and high frequency noises. This will materially enhance the signal-to-noise ratio.

If a defect in a billet is to be corrected, such as by grinding or burning it out, the decision to make a correction and the degree of correction is determined almost entirely on the basis of the depth of the defect, i.e. seam. The configuration of a defect (i.e. its width, inclination, etc.) is of little or no concern. Accordingly, if the systems 112 is to be capable of performing such corrections on an automatic basis it must be capable of accurately determining the depth of the defect free from any operator interpretation.

Figure 11:
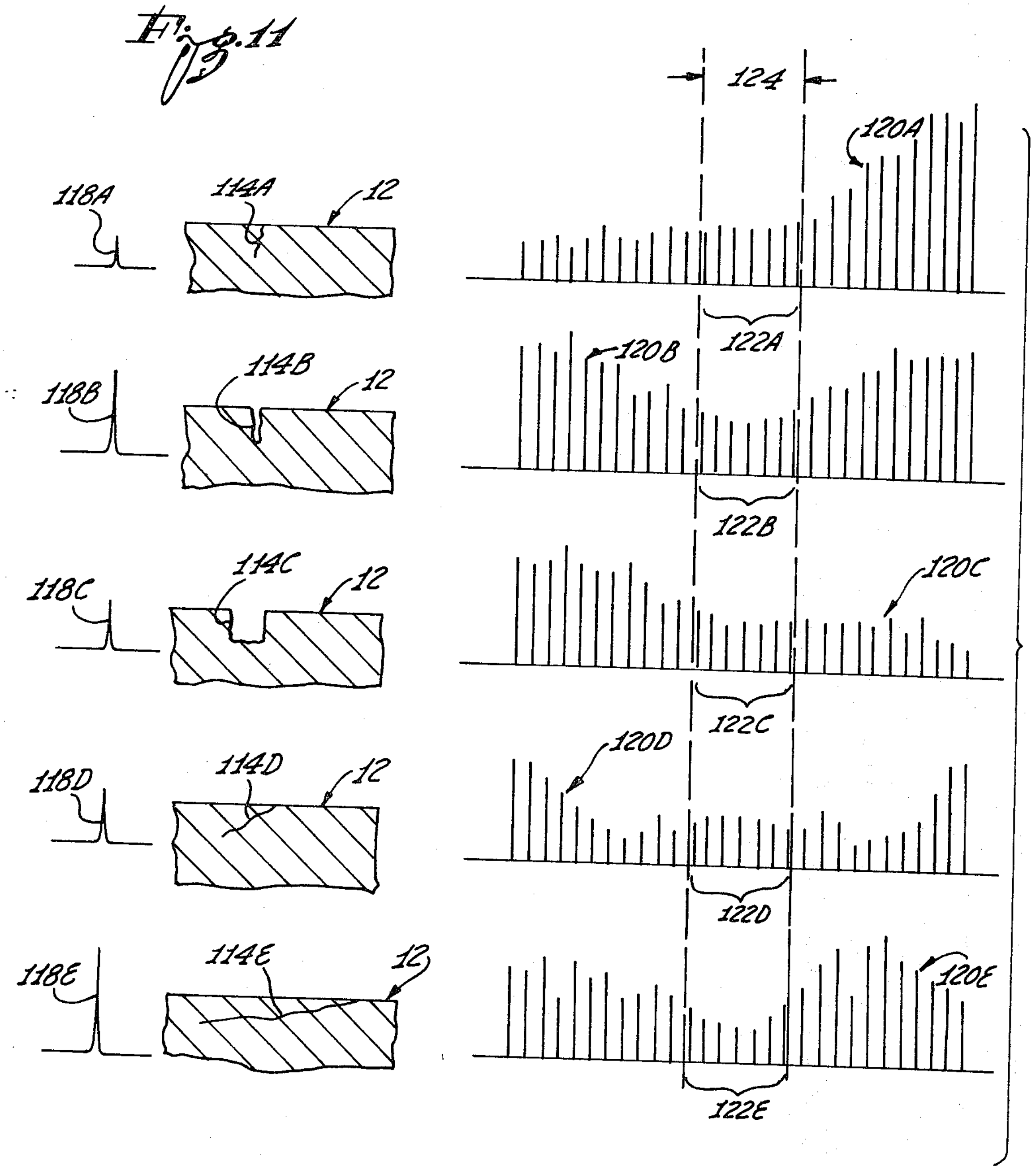
FIG. 11 is a sequence of fragmentary views of a series of billets having different types of discontinuities thereof and the operating characteristics of different portions of the system.

The most common types of defects or seams 14 encountered are illustrated in the center column of FIG. 11 and the signals 118 produced by the pickup 94 are shown in the left column immediately adjacent to each of the defects 14. Although all of the defects are of essentially identical depth, it will be seen the defect signals 118 do not have identical amplitudes. For example, the moderate width seam 114B in line B produce a relatively high amplitude signal 118B. Whereas the very narrow seam 114A of line A and the wide seam 114C of line C produce relatively smaller signals 118A and 118C. Similarly seams 114D and 114E of lines D and E, which are inclined at a considerable angle to the surface, produce signals 118D and 118E having amplitudes that are to a considerable degree a function of the inclination of the seam 114D or 114E. It may thus be seen that a determination of the depth of the seam 14 cannot be made solely on the basis of the amplitude of the signal 118.

If the defect signals 118 in the left column of FIG. 11 are broken down by a Fourier analysis they can be represented as signals 120 having characteristics resembling those in the right column of FIG. 11. It should be appreciated the exact characteristics of the defect signals 118 and the spectral signals 120 will vary considerably from one system to the next. These signals are functions of the composition of the billet 12, scanning speeds, types of probe 94, etc. However, the signals 118 and 120 of FIG. 11 are analogous to those normally encountered and will serve to illustrate the present invention.

The spectral distribution of a signal 120 is a function of the characteristics of the defect 14. The amplitudes of the lower frequency and higher frequency components of the signals vary over a considerable range depending upon the configuration of the defect 14. However, it has been found that for any given system 10 embodying the present invention there is an intermediate range of frequencies wherein the total of all the components within this range is substantially directly related to the depth of the seam 14. For example, as seen in FIG. 11, the sums of the components 122 within the band 124 are all substantially equal since all of the seams 14 are of equal depth.

Accordingly, if the filter 116 is selected so that the pass band coincides with the band 124 the signals from the filter 116 will have amplitudes that tend to be a very nearly linear function of the depth of the seam 14.

The frequency of the pulses, the band over which the components are spread and the spectral distribution of the components within the overall band will vary from system to system and to some extent within the same system as a result of differences in the billet. For example, the thickness and other characteristics of the tape, the physical, magnetic and electrical characteristics of the pickup probe, the speeds at which the system and the probe operate, the clearance between the probe and the tape, etc. may effect the frequency and distribution of the components.

Therefore, for any given system employing this invention, if it is desired to use the filter 116 to make the signal a more lineal function of the depth of the seam 14, the pass band 122 of the filter 116 is normally arrived at by a primarily empirical process, i.e. trial and error.

It has been found the field strength across the face of a billet 12 is not a constant. When a magnetizing current flows axially through the billet 12 it is not necessarily uniformly distributed throughout the billet, particularly when the electrical contacts 80 are close together and the billet 12 has corners 126 with a short radius. The axial current produces a circumferential magnetic field. The inductance along this path varies to a considerable extent. The variations in the inductance is largest when the corners 126 of the billet 12 are sharpest.

As a result of the foregoing and other factors the field strength across the side of the billet 12 may vary over an extremely large range. Normally the field is strongest near the center line and weakest around the corners 126. By way of example, the strength may vary similar to the characteristics of the curve 128 in FIG. 8. Typically the field strength in the region of the corner is only 25 to 40% of the strength around the center. Accordingly, a defect of a given size and shape disposed near the center produces a stray field that may be on the order of 3 or 4 times as large as the field produced by an identical defect located near the corner 126.

It can be appreciated with signal variations of this magnitude it is very difficult to correlate the depth of a defect 14 with the amplitude of the signal from the filter 116. To overcome this difficulty the output from the filter 116 may be interconnected with a sensitivity control 130. This may be a substantially conventional variable gain amplifier having a signal input 132, a signal output 134 and a gain control input 136. The gain of the amplifier 130 is a function of the amplitude of the signal present on the control input 136. Accordingly the signal present on the output 134 is a function of the amplitude of the filtered signal present on the signal input 132 and the amplitude of the control signal present on the control input 136.

By varying the control voltage on the input 136 the gain of the amplifier 130 may be varied to just compensate for the drop-off of the field across the side and around the corner 126. One means of accomplishing this is to generate a control voltage in synchronism with the rotation of the turntable 96. Such a control voltage is phase locked to the scanning of the pickup 94 across the width of the belt 82 and the corresponding position on the face of the billet 12.

In the present instance this control voltage is generated by employing the turntable 96 as an armature in a generator. More particularly, as best seen in FIG. 9, a plurality of permanent magnets 138 are mounted on the turntable 96 and a coil 140 positioned to scan the magnets 138 as they move therepast. The number and disposition of the magnets 138 is a function of several factors such as the extent of the turntable 96 subtended by the belt 82, the nature of the drop-off effect etc.

In this embodiment eight magnets 138 are equally spaced around the turntable 96 and arranged with reversed polarities. During one revolution of the turntable 96 the coil 140 will generate four cycles of a sinewave similar to FIG. 10. It may be seen the shape of this sinewave between $-90°$ and $+270°$ very closely resembles the drop-off characteristics shown in FIG. 8. The sinewave should correspond to the strength of the field as it is recorded on the belt.

Accordingly, by applying the sinewave generated in the pickup 94 to the control input 136, the gain of the sensitivity control amplifier 130 may be varied so as to compensate for the drop-off. As a consequence the amplitude of the output signal is maintained substantially linear with respect to the depth of the defect. It should be understood that although the drop-off characteristics closely resemble a sinewave, it may have a different shape, particularly if the workpieces are shaped differently from a billet. In this event the control voltage may be generated with a wave-shaped and phase resembling the particular drop-off characteristics.

The sensitivity control 130 may be coupled to any suitable means for indicating the characteristics of a defect 14 and/or for correcting the defect such as a seam. For example, an oscilloscope 142 may be connected to receive the signals and produce a visual display. The horizontal deflection means may be synchronized with the scanning of the pickup 94 across the belt 82. The vertical deflection means are responsive to the corrected or compensated signal. Normally there are no defects and no vertical deflection on the face of the oscilloscope. When a defect such as the seam 14 is present and its field is recorded upon the belt a vertical deflection will occur and produce a relatively narrow "spike." The horizontal position of this "spike" corresponds to the lateral position of the seam 14 on the billet 12 and the height corresponds to the depth of the seam 14. As described above, the filter 116 and sensitivity control 130 have substantially eliminated the effects of the size and shape of the defect and its position on the billet. Thus the height of the display is an accurate index of the defect depth. The operator can thereby visually determine the nature of the seam 14.

In addition means may be provided for automatically marking directly on the billet 12 the characteristic of the defect or for automatically removing the defect. To accomplish this a plurality of gates or trigger circuits 144 and 146 may be provided. The trigger circuits 144 or 146 are conventional amplitude responsive circuits whereby an input signal of less than a threshold level is blocked and no output signal is produced. However, if the signal on the input exceeds the threshold level an output signal is produced.

The first trigger 146 may be set to have a threshold corresponding to a signal representing a defect with a depth that is the maximum which can be corrected. The output from this trigger 146 is connected to some suitable type of marker. In the present instance a paint spray gun 148 is used. This gun 148 is filled with paint of some color, such as red to indicate a complete reject. Whenever a signal of this nature occurs the billet 12 is beyond repair and it will be marked with red paint over the length of the irrepairable defect 14. In addition the trigger 146 may actuate the sets 26 of rollers on the end of the line 24. When the billet 12 reaches this end of the line it is dumped into the reject bin.

The second trigger 144 may be set with a threshold level corresponding to the signal produced by a defect having a depth that is equal to the maximum which can be accepted without correction. The output from the trigger 144 may be coupled to a second marker to indicate the location of the repairable defect. This may be one or more paint spray guns 150 filled with a different colored paint, for example white. Accordingly whenever a signal of greater than the acceptable limit occurs the billet 12 will be painted white corresponding to the objectionable seam 14. It may be appreciated if there are no seams 14, or even if there are seams of an accepted depth present, neither the white nor red spray guns 148 or 150 will be actuated. However, in the event the seam 14 is above the acceptable level either one or both of the triggers 144 and 146 will pass a corresponding signal and cause the billet 12 to be marked red and/or white to indicate the location of the objectionable seam 14.

It should be noted after a stray field has been recorded, before a defect signal is produced, it is necessary for the belt 82 to travel a distance corresponding to the distance from the point on the belt engaging the billet to the point scanned by the pickup 94. During this time delay the billet 12 will have traveled the same distance. Accordingly the spray guns 148 and 150 are preferably positioned to aim at a point the same distance from where the belt 82 contacts the billet 12. Thus whenever a mark is sprayed onto the billet 12 it will start and stop in exact alignment with the ends of the seam 14. It can be appreciated this is a form of storage of the defect signals. By a proper selection of belt length, location of the turntable, etc. this storage can be made very long. As a consequence the paint spray guns can be removed an extended distance from the area of the billet 12 contacted by the belt 82.

When a billet 12 is dressed to remove an objectionable seam 14 the billet 12 may be ground, etc. over its entire width. However, since most billets are extremely wide compared to the width of the seam and the amount of correction required, this is a wasteful practice. Accordingly it has been found economically advantageous to divide the billet 12 into several parallel channels. Each of these channels has a width corresponding to that which can be conveniently and efficiently removed by grinding, torch burning, etc. and which will remove the entire defect. By way of example, it has been found convenient to utilize a channel having a width on the order of ¾″. This will divide a 2″ billet into three channels and a 4″ to 4½″ billet into approximately seven separate channels.

In the present instance this is accomplished by providing a channel gate 152 having a signal input 154 coupled to the trigger 144. Separate outputs are coupled to a separate spray gun 150A to 150G for each channel. The channel gate 152 includes a control input 156 which is effective to open the particular portion of the gate 152 corresponding to the section of the belt 82 being scanned by the pickup 94.

In this embodiment a plurality of reference markers are disposed on the turntable corresponding to the channels. Each marker may be a magnetic member or slug 158 equally spaced on the turntable 96. These slugs 158 are separated from each other by an arc corresponding to the distance swept by the pickup probe 94 as it moves across a channel. A suitable pickup, such as the coil 160, may be positioned over the turntable 96 whereby the slugs 158 successively move past the coil 160 and produce a series of reference pulses corresponding to the movement of the probe 94 across the successive channels. Each time one of these signals occurs it is coupled through the amplifier 162 to the control input 156 whereby the gate 152 indexes one position and opens the next successive output.

It will thus be seen each time the pickup 94 scans a segment of the belt 82 the gate 152 will couple the corresponding spray gun 150 to the trigger 144. Accordingly each time an objectionable, but correctible, defect occurs a signal will be coupled through the trigger 144 and corresponding section of the channel gate 152 to the corresponding white spray gun 150A to 150G whereby a white strip will be painted on each channel corresponding to the presence of a defect. It will thus be readily apparent to an operator that appropriate corrections should be made to the billet. By merely grinding or torch burning etc. the full width of the channel and to the maximum correctible depth for the full length of the white stripe the defect will be removed. It can be appreciated this is the type of operation that can be performed by a machine. As a consequence an automatic grinding wheel or torch etc. may be used to replace the spray gun whereby a fully automatic correction of the billet can be accomplished.

In order to utilize the present apparatus for inspecting a group of billets the fully rolled billets 12 are assembled in the storage area 20. The operator then manipulates the controls at the console 40 to start the operation of the system. Normally once the system is started all of the billets in the storage area 20 are fully automatically inspected without further intervention by the operator. The loader 22 then automatically lifts the successive billets 12 sideways onto the sets 26 of rollers in the conveyor line 24. The billets 12 are then fed lengthwise through the two inspection units 46 and 48.

When the leading end of a billet 12 enters the inspection units 46 and 48 and passes the successive photo cells, the inspection heads 64 and 66 are extended and the test current circulated through the billet. The magnetic belt 82 is then rolled along the face of the billet 12. Any stray fields produced by the test current flowing between the contacts 80 and through the billet 12 are recorded on the belt 82. Before the belt 82 reaches the billet 12 it has been found desirable for the belt 82 to pass over an erase head 164 so as to remove any prior recordings.

It has been found a considerable amount of power may be expanded by the erase head 164 and if the belt 82 stops it may become excessively heated. Accordingly to avoid damage to the belt 82 it is desirable to deenergize the erase head 164 if the belt 82 stops. Incidentally it should be noted that if desired the belt 82 may be stopped and repeatedly scanned by the pickup to produce a continuous display on the oscilloscope 142 of a particular line or segment of the belt 82.

Normally there are no defects, such as seams 14, present in the billet 12 and no stray fields recorded upon the magnetic belt 82. As a consequence no signals will be produced by the pickup probe 94 as it is scanned across the belt 82 and none of the spray guns 148 or 150 etc. will be actuated. If the billet 12 is free of unacceptable defects over its entire length it is unloaded from the conveyor line 24 into an area for acceptable billets.

If a seam 14 is present the current circulated through the billet 12 will produce stray fields which are recorded on the belt 82. As that portion of the belt 82 moves across the turntable 96 the pickup 94 scans across the recorded field and produces a signal. This signal is then coupled through the amplifier 114 to the filter 116. Because of the band pass characteristics of this filter 116 the filtered signal will have an output which is primarily a function of the depth of the seam 14 and sufficiently independent of the characteristics of the seam to permit an automatic determination of the seam depth.

The filtered signal is then coupled into the sensitivity control 130. As the magnets 138 move past the pickup coil 140 a control signal is generated and coupled to the sensitivity control 130. The signal is then compensated for the drop-off effect occurring in and around the corners 126 of the billet 12. As a result the signals from the sensitivity control 130 will be independent of the lateral displacement of the seam 14 on the billet 12.

The fully compensated signal is then coupled to the triggers 148 and 150. If there is no seam, or a seam of acceptable depth, no signal passes through either trigger. However, if an objectionable seam 14 exceeding the acceptable limit occurs, a signal is coupled through one or both triggers 148 and 150 to mark the billet 12 red to indicate it is irrepairable or white along a particular channel to indicate a repairable defect is present.

When the trailing end of the billet passes the photo cells the test heads, etc. are retracted into the non-inspection position for the next billet. It has been found desirable to energize each of the spray guns for a short burst as the uninspected end of the billet leaves the area of spray guns. This will prevent the paint drying in the guns and blocking them. Also, it will record the fact that the side of the billet has been inspected. Also, the operator can review the paint stripes to make sure all of the guns are working. If one of the guns is out of paint, plugged up, etc. the channel will be free of any short paint stripe.

While only a single embodiment of the present invention has been disclosed herein, it will be readily apparent to persons skilled in the art that numerous changes and modifications may be made thereto without departing from the scope of the invention. For example, although the present embodiment is particularly adapted for testing steel billets, it may be used to inspect similar objects or it may be extensively modified to inspect any other type of workpiece. It should also be noted a grinding wheel, burning torch, etc. may be employed to dress the billet and remove the defect automatically instead of using the spray guns to merely mark the billet. When the billet being inspected has a correctible seam the grinding wheel or torch, etc. is actuated to remove the full width of the channel to a depth corresponding to the maximum depth of a repairable seam, i.e. the threshold level of the trigger. As a result the billet is completely inspected and dressed without any human interpretation, etc. Accordingly, the foregoing disclosure and description thereof are for illustrative purposes only and do not in any way limit the invention which is defined only by the claims which follow.

What I claim is:

1. An inspection system for inspecting elongated workpieces including the combination of a first storage area for accumulating uninspected workpieces, a second storage area for accumulating inspected workpieces, at least one inspection station disposed between the first and second storage areas to inspect the workpieces as they pass therethrough, a conveyor extending between said first and second storage areas and through said inspection station, said conveyor being effective to transport said workpieces from the first storage area axially through the inspection station to the second storage area, magnetizing means disposed adjacent the inspection station for magnetizing at least the portion of the workpiece traveling through said inspection station, said magnetic means being effective to produce stray magnetic fields around any discontinuities in the workpiece, mounting means in the inspection station, magnetic recording means moveably carried within the inspection station by said mounting means for recording stray magnetic fields thereon, said mounting means being effective to allow the magnetic recording means to "float" within the inspection station and to bias the recording means against the workpiece as it travels through the inspection station and maintain said recording means in a substantially constant relationship to said workpiece whereby the stray magnetic fields adjacent discontinuities in the workpiece are recorded upon the recording means, pickup means in said inspection station for scanning said magnetic recording means and the stray fields recorded thereon, said pickup means being effective to produce electrical signals corresponding to said discontinuities, output means coupled to the pickup means and responsive to said electrical signals, said last means being effective to indicate the characteristics of the discontinuities in the workpieces after they have passed through the inspection station and have been inspected, said magnetic recording means includes a magnetic belt that travels along said workpiece in a first direction for recording the stray fields thereon, a rotor positioned adjacent the recording means, said pickup means being mounted on said rotor and carried thereby for scanning said magnetic belt in a second direction substantially normal to said first direction whereby said signals correspond to the stray field across the workpiece and have a time occurrence corresponding to the position of a discontinuity in said second direction, reference means coupled to said rotor and effective to produce a series of timing signals which correspond to the displacement of the pickup means in the second direction, gating means coupled to said reference means and to said pickup means and responsive to the timing signals from said reference means for separating said stray field signals into a plurality of separate channels corresponding to a series of separate parallel inspection zones extending in said first direction on said workpiece, and separate indicating means in each of said channels responsive to said separated pulse signals and effective to indicate the characteristics of said workpiece in the corresponding zone.

2. An inspection system for inspecting steel billets having four sides defining four substantially planar surfaces, said system including the combination of a first storage area for accumulating uninspected steel billets, a second storage area for accumulating inspected steel billets, at least one inspection station disposed between the first and second storage areas for inspecting said billets, a conveyor line extending from the first storage area, through the inspection station to the second storage area and effective to transport said billets axially through the inspection station, magnetizing means for creating a magnetic field in the portion of the billet disposed within the inspection station whereby stray magnetic fields are produced above said surfaces in the vicinity of any discontinuities in said surfaces, mounting means in the inspection station, a pair of magnetic recording means moveably carried within the inspection station by said mounting means for recording stray magnetic fields thereon, said mounting means being effective to simultaneously bias the two recording means against two separate sides of the workpiece as it travels through the inspection station, said mounting means being effective to allow each of said magnetic recording means to "float" within the inspection station and be maintained in substantially uniform recording relation with their respective sides of the workpiece whereby each of the recording means linearly records the stray fields adjacent any discontinuities in its respective surface, pickup means effective to scan said recording means and produce electrical signals corresponding to the stray fields recorded thereon, output means coupled to the pickup means and responsive to said signals, said output means being effective to indicate the characteristics of the billets after they have passed through the inspection station and been inspected, the signals produced by said pickup means includes components whose amplitude within a range of frequencies is a function of the depth of said discontinuity and substantially independent of the shape of the discontinuity, and filter means in said output means having a pass band which passes said components of said signal within said frequency range and suppresses the other portions of said signal, sorting means in said conveyor adjacent the second storage area, said sorting means being coupled to said output means and responsive to the passed portion of said signal and effective to divert billets having discontinuities of a first depth into a first portion of the second storage area and discontinuities of a second depth into a second portion of the second storage area.

3. An inspection system for inspecting steel billets having four sides defining four substantially planar surfaces, said system including the combination of a first storage area for accumulating uninspected steel billets, a second storage area for accumulating inspected steel billets, at least one inspection station disposed between the first and second storage areas for inspecting said billets, a conveyor line extending from the first storage area through the inspection station to the second storage area and effective to transport said billets axially through the inspection station, magnetizing means for creating a magnetic field in the portion of the billet disposed within the inspection station whereby stray magnetic fields are produced above said surfaces in the vicinity of any discontinuities in said surfaces, mounting means in the inspection station, a pair of magnetic recording means moveably carried within the inspection station by said mounting means for recording stray magnetic fields thereon, said mounting means being effective to simultaneously bias the two recording means against two separate sides of the workpiece as it travels through the inspection station, said mounting means being effective to allow each of said magnetic recording means to "float" within the inspection station and be maintained in substantially uniform recording relation with their respective sides of the workpiece whereby each of the recording means linearly records the stray fields adjacent any discontinuities in its respective service, pickup means effective to scan said recording means and produce electrical signals corresponding to the stray fields recorded thereon, output means coupled to the pickup means and responsive to said signals, said output means being effective to indicate the characteristics of the billets after they have passed through the inspection station and been inspected, said magnetic belt in each of said recording means, each of said belts being in the form of an endless loop that travels along said billet in a direction parallel to the travel thereof, said belts being effective to record the stray fields on their respective side of the billet, a rotor in each of said recording means positioned adjacent the magnetic belt therein, said pickup means being mounted on said rotor for scanning said belts at substantially right angles to said first direction for producing a signal indicative of discontinuities and having a time occurrence corresponding to the position of the discontinuities in directions normal to the travel of the billet, separate reference means coupled to each of said rotors to produce separate series of timing signals which correspond to the positions of the pickup means in the second direction, separate gating means coupled to each of said pickup means and responsive to the corresponding timing signals for separating the corresponding discontinuity signals into a plurality of separate channels corresponding to a series of separate, parallel zones extending in the first direction along the respective side of said billet, and separate indicating means in each of said channels and responsive to said signals and effective to indicate the characteristics of said billet in the corresponding zone.

4. An inspection system for inspecting elongated workpieces including the combination of a first storage area for accumulating uninspected workpieces, a second storage area for accumulating inspected workpieces, at least one inspection station disposed between the first and second storage areas to inspect the workpieces as they pass therethrough, a conveyor extending between said first and second storage areas and through said inspection station, said conveyor being effective to transport said workpieces from the first storage area axially through the inspection station to the second storage area, magnetizing means disposed adjacent the inspection station for magnetizing at least the portion of the workpiece traveling through said inspection station, said magnetic means being effective to produce stray magnetic fields around any discontinuities in the workpiece, mounting means in the inspection station, magnetic recording means moveably carried within the inspection station by said mounting means for recording stray magnetic fields thereon, said mounting means being effective to allow the magnetic recording means to "float" within the inspection and to bias the recording means against the workpiece as it travels through the inspection station and maintain said recording means in a substantially constant relationship to said workpiece whereby the stray magnetic fields adjacent discontinuities in the workpiece are recorded upon the recording means, pickup means in said inspection station for scanning said magnetic recording means and the stray fields recorded thereon, said pickup means being effective to produce electrical signals corresponding to said discontinuities, output means coupled to the pickup means and responsive to said electrical signals, said last means being effective to indicate the characteristics of the discontinuities in the workpieces after they have passed through the inspection station and have been inspected, the tangential field force produced by the magnetizing means at the surface of the workpiece varies in a transverse direction across the surface according to a predetermined function, the recording means includes an endless magnetic belt which is rolled longitiudinally along the surface of the workpiece traveling through the inspection station, biasing means effective to force said portion of the belt against the surface of the billet whereby the stray fields are recorded on the belt, means for scanning said pickup means transversely across said belt, and control means coupled to said means for scanning and adapted to generate a signal which varies according to the predetermined function of said tangential field, said control means being coupled to said output means and effective to vary the response of said output means to the signals from the pickup means according to said function.

5. An inspection unit for inspecting the surfaces of workpieces having stray magnetic fields corresponding to the shape and the depth of discontinuities in said surface, said unit including the combination of an inspection head for being disposed adjacent to said workpiece for traveling along said surface in a first direction, an endless loop of magnetic tape in said inspection head, guide means in said inspection head for maintaining one section of the tape in intimate rolling contact with the surface of the workpiece as said inspection head travels therealong whereby stray magnetic fields are recorded on said tape, said guide means being effective to maintain a second section of the tape spaced from the workpiece, pickup means in said inspection head for scanning across the second section of said tape for producing signals corresponding to the stray fields recorded thereon, said pickup means scanning the tape at a rate which is independent of the speed said tape travels along the workpiece, said signals including a portion whose amplitude within a range of frequencies is a function of the depth of the discontinuity, filter means coupled to said pickup means and effective to pass only said portion of said signals within said frequency range and to suppress all other portions of said signals, and output means coupled to said filter means and responsive to the passed portion of the signal, said output means being effective to indicate the depth of the discontinuity.

6. The inspection unit of claim 5 wherein
said filter means includes upper and lower cutoff frequencies defining a pass band whereby the portion of said signals having frequencies above the upper cutoff and frequencies below the lower cutoff are suppressed and only the portion of said signals within said band are passed,
said upper and lower cutoff frequencies being so selected that the pass band includes said portion of the signals which is substantially independent of the shape of the discontinuity and corresponds to the depth of the discontinuity.

7. The inspection unit of claim 6 including
a rotor,
the pickup means is carried by said rotor for cutting across the flux from the recorded stray field whereby the pass band of the filter means is a function of the rate of rotation of the rotor.

8. An inspection unit for inspecting workpieces for discontinuities in the surface thereof, said unit including the combination of
an inspection head for being disposed adjacent to said workpiece for traveling along said surface in a first direction,
magnetizing means for creating a magnetic field in said workpiece whereby stray magnetic fields are produced above said surface adjacent discontinuities, said stray fields being a function of the discontinuity and of its position in a second direction at substantially right angles to the first direction, said magnetic field also varying across the surface of the workpiece according to a predetermined function,
an endless loop of magnetic tape in said inspection head,
guide means in said inspection head for maintaining one section of the tape in intimate rolling contact with the surface of the workpiece as said inspection head travels therealong in the first direction whereby stray magnetic fields are recorded on said tape, said guide means being effective to maintain a second section of the tape spaced from the workpiece,
a rotor disposed adjacent said tape,
pickup means mounted on said rotor scanning across the second section of said tape in said second direction for producing signals corresponding to the stray fields recorded thereon, and
control means coupled to said rotor and adapted to generate a signal which varies according to said predetermined function of said magnetic field, output means coupled to said pickup means and responsive to said signal, said control means being coupled to the output means and effective to vary the response of the output means to the signals from said pickup means according to said function.

9. The inspection unit of claim 8 wherein
the magnetizing means includes electrical contacts that engage the workpiece as the inspection unit travels therealong, said contacts being effective to produce a magnetizing current flow through said workpiece.

10. The inspection unit of claim 8 wherein
the width of the tape exceeds the width of the surface of the workpiece to be inspected whereby there are surplus edge portions on said tape, and
erase means effective to erase magnetic fields from said surplus edge portions before they are scanned by the pickup means.

11. An inspection unit for traveling in a first direction along the surface of an electrically conductive workpiece for detecting discontinuities in said workpiece, said inspection unit including the combination of
guide means for guiding said inspection unit along said surface in said first direction,
an endless loop of recording tape having a first segment in contact with said surface and the remaining segment removed from said surface, said guide means being effective to roll said tape along said surface in said first direction and maintain said first segment in contact with said surface,
means for magnetizing said workpiece whereby a magnetic field is produced across the workpiece in a second direction substantially normal to the first direction,
said magnetic field varying in said second direction according to a predetermined function, and also stray fields are produced above said surface which are a function of a discontinuity and its displacement in the second direction,
rotor disposed adjacent the second segment of said tape,
a pickup probe mounted on said rotor for scanning across said tape in second direction and producing signals corresponding to the stray fields recorded thereon,
a function generator coupled to said rotor and responsive to the position of the pickup means in the second direction, said function generator being effective to produce a control signal which varies according to said predetermined function, and
output means coupled to said pickup and responsive to said first signal, said output means being coupled to said function generator and effective to vary the response thereof according to said control signal.

12. A system for inspecting the surface of a workpiece having an axis and dimensions in the transverse and longitudinal directions, said system being effective to identify discontinuities and including the combination of
current contacts for engaging said workpiece and circulating an electric current axially thereof through a section of the workpiece whereby stray magnetic fields are produced above said surface and adjacent the discontinuities, the magnitude of a stray field being a function of the size of the discontinuity,
an endless magnetic belt for rolling along said workpiece in engagement with the surface of said section for recording the stray fields thereon,
a rotor disposed adjacent the magnetic belt,
pickup means mounted on said rotor for scanning transversely across said belt, said pickup means being responsive to said recorded stray fields and effective to produce an electrical signal that is a function thereof,
a function generator coupled to said rotor and effective to generate a control signal which varies as a function of the displacement of said pickup means in said transverse direction,
output means coupled to the pickup means for amplifying said electrical signal, and
gate means coupled to said output means and coupled to the function generator, said gate means being controlled by said control signal and effective to divide the electrical signal from the output means into a plurality of signals as a function of the displacement of said pickup means in said transverse direction whereby each of the signals in said plurality correspond to an inspection zone extending longitudinally of the workpiece.

13. A billet inspection system for inspecting the surface of an elongated steel billet for seams in the surface thereof, said system including the combination of
means for circulating an electric current axially through said steel billet so as to produce stray magnetic fields above said surface and adjacent a seam, the magnitude and shape of the stray fields being a function of the depth of the seam and a function of the shape of the seam,
an endless loop of magnetic tape for traveling longitudinally along the surface of said workpiece and recording the stray fields thereon,
a rotor disposed adjacent the tape,
pickup means mounted on said rotor for being scanned across said tape and responsive to the stray fields recorded thereon and effective to produce an electric signal, said electric signal having a portion whose magnitude within a predetermined frequency range is substantially independent of the shape of the seam and a function of only the depth of the seam, and a filter coupled to the pickup means and responsive to said electric signal, said filter having a pass band corresponding to said frequency range.

References Cited

UNITED STATES PATENTS

| | | | |
|---|---|---|---|
| 2,648,435 | 8/1953 | Kodis | 324—37 |
| 2,682,442 | 6/1954 | Keaton et al. | 324—37 |
| 2,764,733 | 9/1956 | De Forest | 324—38 |
| 2,770,773 | 11/1956 | Cooley | 324—37 |
| 2,994,032 | 7/1961 | Hansen | 324—38 |
| 3,202,914 | 9/1965 | Deem et al. | 324—37 |
| 3,209,243 | 9/1965 | Walters et al. | 324—37 |
| 3,262,053 | 7/1966 | Nasir et al. | 324—37 |
| 3,341,771 | 9/1967 | Crouch et al. | 324—37 |
| 3,345,563 | 10/1967 | Wood | 324—37 |
| 3,066,254 | 11/1962 | Price et al. | 324—37 |
| 3,247,453 | 4/1966 | Quittner | 324—37 |

RUDOLPH V. ROLINEC, Primary Examiner

R. J. CORCORAN, Assistant Examiner